United States Patent
Sakamoto et al.

(10) Patent No.: US 11,925,130 B2
(45) Date of Patent: Mar. 12, 2024

(54) PIERCING TOOL

(71) Applicant: SAKAMOTO SEIKI CO., LTD., Nomi (JP)

(72) Inventors: Koichi Sakamoto, Nomi (JP); Tomoyuki Sakamoto, Nomi (JP)

(73) Assignee: SAKAMOTO SEIKI CO., LTD., Nomi (JP)

(*) Notice: Subject to any disclaimer, the term of this patent is extended or adjusted under 35 U.S.C. 154(b) by 387 days.

(21) Appl. No.: 17/281,846

(22) PCT Filed: Sep. 30, 2019

(86) PCT No.: PCT/JP2019/038467
§ 371 (c)(1),
(2) Date: Mar. 31, 2021

(87) PCT Pub. No.: WO2020/071302
PCT Pub. Date: Apr. 9, 2020

(65) Prior Publication Data
US 2021/0378159 A1    Dec. 9, 2021

(30) Foreign Application Priority Data
Oct. 1, 2018   (JP) .................................. 2018-186797

(51) Int. Cl.
*A01B 45/02* (2006.01)
(52) U.S. Cl.
CPC ..................... *A01B 45/02* (2013.01)
(58) Field of Classification Search
CPC ....... A01B 45/00; A01B 45/02; A01B 45/023; A01B 45/026; E02F 9/2891
See application file for complete search history.

(56) References Cited

U.S. PATENT DOCUMENTS

| | | | |
|---|---|---|---|
| 6,003,612 A * | 12/1999 | Knight | A01B 45/023 |
| | | | 172/20 |
| 7,743,840 B2 * | 6/2010 | Hoffman | A01B 45/02 |
| | | | 280/32.7 |

(Continued)

FOREIGN PATENT DOCUMENTS

| | | |
|---|---|---|
| JP | 2012-249434 A | 12/2001 |
| JP | 2004-41133 A | 2/2004 |

(Continued)

OTHER PUBLICATIONS

International Search Report (PCT/ISA/210) issued in PCT/JP2019/038467, dated Jan. 7, 2020.

(Continued)

*Primary Examiner* — Jamie L McGowan
(74) *Attorney, Agent, or Firm* — Birch, Stewart, Kolasch & Birch, LLP

(57) ABSTRACT

A piercing tool can be used by optionally replacing a distal end portion, which is to be first brought into abutment against an object to be pierced such as the ground, and can facilitate a replacement operation of the distal end portion. A piercing tool includes: a distal end portion, which has a cylindrical shape, and is to be first brought into abutment against an object; and a main body portion, which has a cylindrical shape at the main body portion, and has one end portion to which the distal end portion is mounted, wherein the distal end portion is removably mounted to the one end portion of the main body portion. The distal end portion has an inner peripheral surface having a female thread formed at an end portion of the distal end portion on a side to be mounted to the main body portion.

12 Claims, 11 Drawing Sheets

(56) References Cited

U.S. PATENT DOCUMENTS

2003/0132632 A1* 7/2003 Schoonen ............. F16L 37/088
                                                          285/333
2014/0224512 A1* 8/2014 Skaff .................... A01B 45/023
                                                          148/279

FOREIGN PATENT DOCUMENTS

| JP | 2004-113156 A | 4/2004 |
| --- | --- | --- |
| JP | 2007-170589 A | 7/2007 |
| JP | 3137779 U | 12/2007 |
| JP | 2010-22297 A | 2/2010 |
| JP | 4555194 B2 | 9/2010 |
| JP | 6054573 B1 | 12/2016 |

OTHER PUBLICATIONS

Written Opinion of the International Searching Authority (PCT/ISA/237) issued in PCT/JP2019/038467, dated Jan. 7, 2020.
English translation of International Preliminary Report on Patentability and Written Opinion dated Apr. 15, 2021, in PCT/JP2019/038467.

* cited by examiner

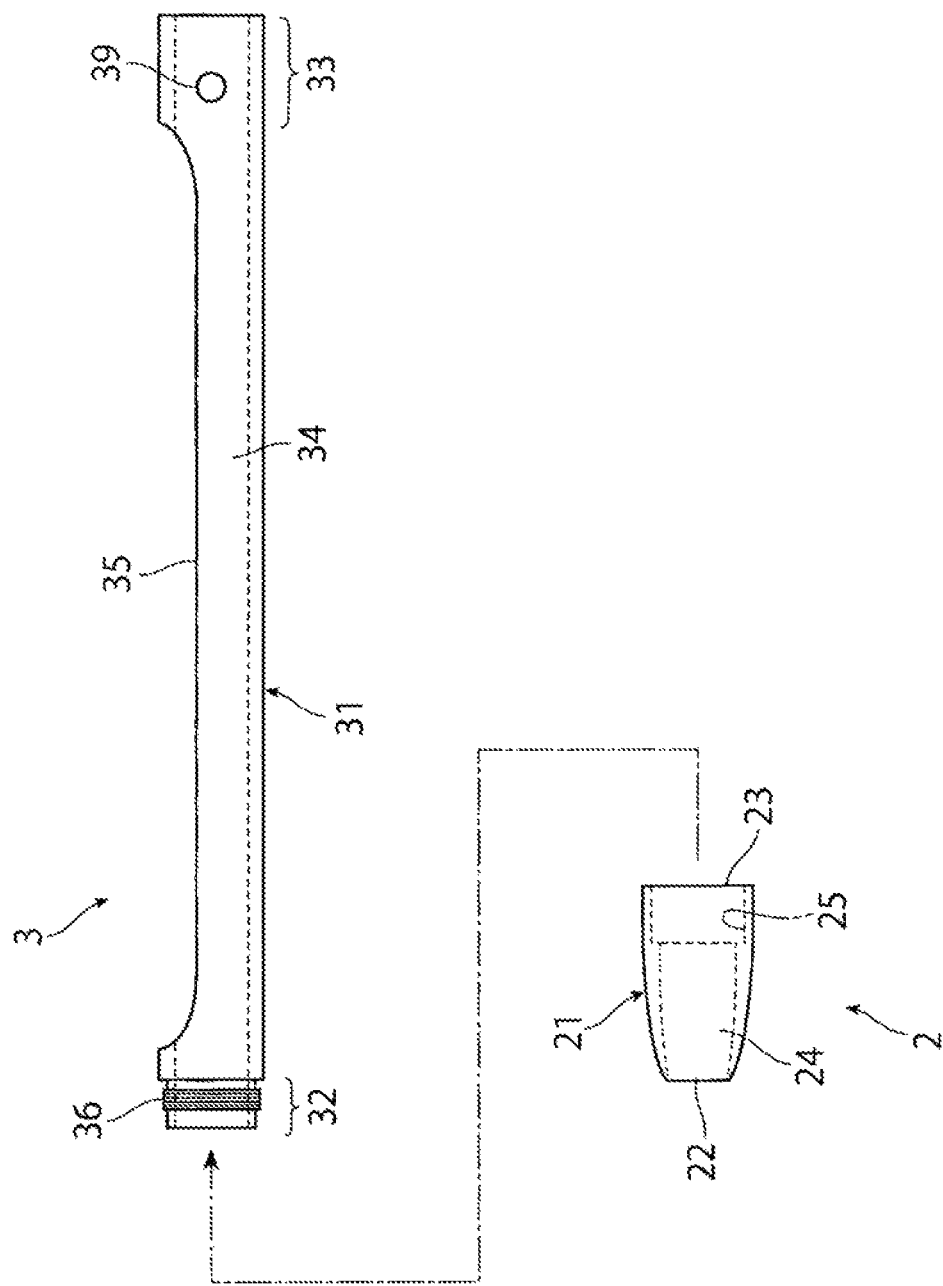

PIERCING TOOL

TECHNICAL FIELD

The present invention relates to a piercing tool, and more specifically, to a piercing tool to be used for operations such as perforation, boring, and punching, which are performed by piercing an object represented by the ground such as turf and a base material such as leather with the piercing tool and pulling out the piercing tool.

BACKGROUND ART

Hitherto, as a piercing tool referred to as a tine to be used for an operation such as perforation, which is performed by piercing the ground such as turf with the piercing tool and pulling out the piercing tool, those as described in Patent Literatures 1 to 3 below have been known, for example.

In Patent Literature 1, there is described a tine including a tine main body having a hollow cylindrical shape with an open distal end. The tine main body has an opening portion formed in a circumferential surface thereof so as to extend in a lengthwise direction of the tine main body. The opening portion has a circumferential angle of 180° or more and 210° or less with the center axis of the tine main body as a center.

Further, in Patent Literature 2, there is described a tine configured to perforate turf. The tine includes an insertion cylindrical portion, a cylindrical distal end portion, and a tubular cutting portion. The insertion cylindrical portion has a substantially cylindrical shape and includes a distal-end opening portion on a distal end side and an attaching portion on a proximal end side. The attaching portion is to be attached to an aeration apparatus. The insertion cylindrical portion is configured to discharge soil of the turf, which is introduced from the distal-end opening portion, from a side-surface opening portion formed in a side surface. The cylindrical distal end portion has an opening portion continuous with the distal-end opening portion arranged on the distal end side of the insertion cylindrical portion, and is configured to cut the soil of the turf. The tubular cutting portion has a shape obtained by raising an outer peripheral portion of the cylindrical distal end portion in a ring shape. An edge of the raised portion on the distal end side is formed so as to function as a portion of a blade for cutting. The tubular cutting portion is configured to cut the soil of the turf so as to have a diameter larger than that of the soil cut by the cylindrical distal end portion.

Further, in Patent Literature 3, there is described a tine including a main body, a tip blade, and a plurality of spiral stripes. The main body has a discharge port formed by cutting a part of a side peripheral surface of a cylindrical body having an opening portion at a distal end. The tip blade is formed to be tapered at the distal end of the main body so as to narrow the opening portion. The plurality of spiral stripes protrude spirally from the opening portion to the discharge port along an inner periphery of the main body. When the main body pierces the ground, the tine cuts roots of grass introduced into the main body from the opening portion with the tip blade by twisting the grass along the plurality of spiral stripes.

CITATION LIST

Patent Literature

[PTL 1] JP 2010-22297 A
[PTL 2] JP 4555194 B2
[PTL 3] JP 6054573 B2

SUMMARY OF INVENTION

Technical Problem

In such related-art piercing tools, a piercing operation is repeatedly performed on an object such as the ground, with the result that the distal end portion, which is to be first brought into abutment against the object, may be worn or partially broken.

However, in this case, in the related-art piercing tools, it is required to replace the whole piercing tool including the distal end portion to cope with the situation.

Further, in the related-art piercing tools, for example, when conditions such as a state, a geological condition, a thickness, and a material of the object such as the ground (turf or the like) differ at the time of performing the piercing operation on the object such as the ground, in view of performing the piercing operation stably in a more appropriate manner, it may be required to change a material of the piercing tool itself or a hole diameter or a shape of a distal end hole formed at the distal end portion.

However, even in this case, in the related-art piercing tools, there is no other choice but to replace the whole piercing tool including the distal end portion to cope with the situation.

The present invention provides a piercing tool which can be used by optionally replacing a distal end portion, which is to be first brought into abutment against an object to be pierced such as the ground, and can facilitate a replacement operation of the distal end portion.

Solution to Problem

According to a piercing tool of the present invention (1), there is provided a piercing tool, including: a distal end portion, which has a cylindrical shape, and is to be first brought into abutment against an object; and a main body portion, which has a cylindrical shape at at least a part of the main body portion, and has one end portion to which the distal end portion is mounted, wherein the distal end portion is removably mounted to the one end portion of the main body portion, and has an inner peripheral surface having a female thread formed at an end portion of the distal end portion on a side to be mounted to the main body portion, wherein the main body portion has an outer peripheral surface having a male thread formed so as to be engaged with the female thread at the end portion of the main body portion on a side to which the distal end portion is mounted, and wherein the distal end portion has a Rockwell hardness higher than a Rockwell hardness of the main body portion.

Further, according to the piercing tool of the present invention (2), in the piercing tool according to the invention (1) described above, the male thread includes an incomplete thread portion formed in an inner end portion area away from the one end portion of the main body portion.

According to the piercing tool of the present invention (3), in the piercing tool according to the invention (2) described above, the incomplete thread portion is a portion that engages with a part of the female thread of the distal end portion in a non-normal state, and is formed in a shape in which valleys of the male thread become shallower as being away from the one end portion of the main body portion.

According to the piercing tool of the present invention (4), in the piercing tool according to any one of the inventions (1) to (3) described above, the Rockwell hardness of the distal end portion is set within a range of from 59 or more and 64 or less, and the Rockwell hardness of the main body portion is set within a range of from 50 or more and 56 or less.

Further, according to the piercing tool of the present invention (5), in the piercing tool according to any one of the inventions (1) to (4) described above, the main body portion includes a wall surface portion that stops the end portion of the distal end portion through contact, and an outer peripheral surface portion having a groove shape in which the male thread is absent between the wall surface portion and the male thread.

According to the piercing tool of the present invention (6), in the piercing tool according to any one of the inventions (1) to (5) described above, the main body portion includes an outer peripheral surface portion having a cylindrical shape in which the male thread is absent at the end portion on the side to which the distal end portion is mounted, and the distal end portion includes an inner peripheral surface portion having an annular shape into which the outer peripheral surface portion having the cylindrical shape is fitted on a far side of the female thread in the inner peripheral surface in which the female thread is formed.

According to the piercing tool of the present invention (7), in the piercing tool according to any one of the inventions (1) to (6) described above, an outer peripheral surface of the distal end portion has an injection hole for injecting an adhesive, which penetrates through the outer peripheral surface of the distal end portion, formed in an area in which the female thread is present.

According to the piercing tool of the present invention (8), in the piercing tool according to any one of the inventions (1) to (7) described above, an outer peripheral surface of the distal end portion has a hook hole for inserting a projection of a hook spanner.

According to the piercing tool of the present invention (9), in the piercing tool according to any one of inventions (1) to (8) described above, the piercing tool includes, as the distal end portion, a plurality of distal end portions of different kinds that differ in one or both of a size and a shape of an opening of a distal end port to be first brought into abutment against the object, or a plurality of distal end portions of different kinds that differ in a material.

Advantageous Effects of Invention

According to the piercing tool of the invention (1) described above, the distal end portion is removably mounted to the one end portion of the main body portion, and the Rockwell hardness of the distal end portion is higher than the Rockwell hardness of the main body portion. Thus, the piercing tool can be used by optionally replacing the distal end portion, which is to be first brought into abutment against the object to be pierced such as the ground, and the replacement operation of the distal end portion can easily be performed.

With this, in the piercing tool, for example, even when the piercing operation is repeatedly performed on the object such as the ground, with the result that the distal end portion of the piercing tool is worn or partially broken, the distal end portion can be replaced with a new distal end portion to cope with the situation.

Further, in the piercing tool, for example, even when conditions such as a state, a geological condition, a thickness, and a material of the object such as the ground differ at the time of performing the piercing operation on the object such as the ground, the distal end portion can be replaced with a distal end portion of a kind of a material and a mode adapted to the state or the condition of the object to cope with the situation.

Further, in the piercing tool, when the distal end portion is to be replaced with a new distal end portion, for example, the distal end portion to be replaced is hit to apply impact so that cracks are easily formed in the distal end portion, thereby being capable of easily removing the distal end portion having the cracks formed therein from the main body portion.

According to the piercing tool of the invention (2) described above, the female thread of the distal end portion forcibly engages with the incomplete thread portion of the male thread of the main body portion so that the fastened state of the female thread and the male thread is less liable to be loosened. In addition, even when the fastened state starts to be loosened, the fear that the distal end portion is easily removed from the main body portion is reduced.

According to the piercing tool of the invention (3) described above, the fastening of the threads between the distal end portion and the main body portion can be made less liable to be loosened by the incomplete thread portion having a relatively simpler configuration.

According to the piercing tool of the invention (4) described above, it is possible to easily ensure the durability of the distal end portion and perform the replacement operation of the distal end portion.

According to the piercing tool of the invention (5) described above, the distal end portion can be mounted to the main body portion without any gap under a state in which the female thread of the distal end portion is securely fastened to the male thread of the main body portion.

According to the piercing tool of the invention (6) described above, when the distal end portion is to be mounted to the main body portion, the outer peripheral surface portion having an annular shape in the main body portion is fitted into the inner peripheral surface portion having an annular shape in the distal end portion, thereby being capable of rigidly mounting the distal end portion to the main body portion.

According to the piercing tool of the invention (7) described above, when the distal end portion is mounted to the main body portion, the female thread and the male thread can be bonded to each other with the adhesive, thereby being capable of more rigidly mounting the distal end portion to the main body portion.

According to the piercing tool of the invention (8) described above, when the distal end portion is to be mounted to or removed from the main body portion, with use of the hook spanner, the female thread and the male thread can be fastened or loosened easily and accurately. In particular, even when the incomplete thread portion is formed in the male thread, the female thread and the male thread can be fastened and loosened easily and accurately without damaging the distal end portion.

According to the piercing tool of the invention (9) described above, a distal end portion of a kind adapted to a state or a condition of the object can be selected, and hence the adapted distal end portion can be mounted to the main body portion, and the piercing tool can be used.

BRIEF DESCRIPTION OF DRAWINGS

FIG. 2 is a side view for illustrating the disassembled state of the piercing tool of FIG. 1(A).

DESCRIPTION OF EMBODIMENTS

Now, embodiments of the present invention are described with reference to the attached drawings.

First Embodiment

Figure 1A:
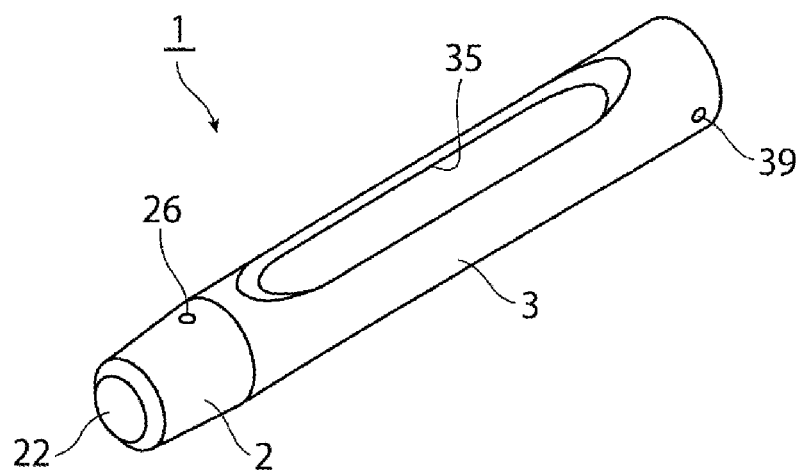
FIG. 1(A) is a perspective view for illustrating an assembled state of a piercing tool according to a first embodiment.
Figure 1B:
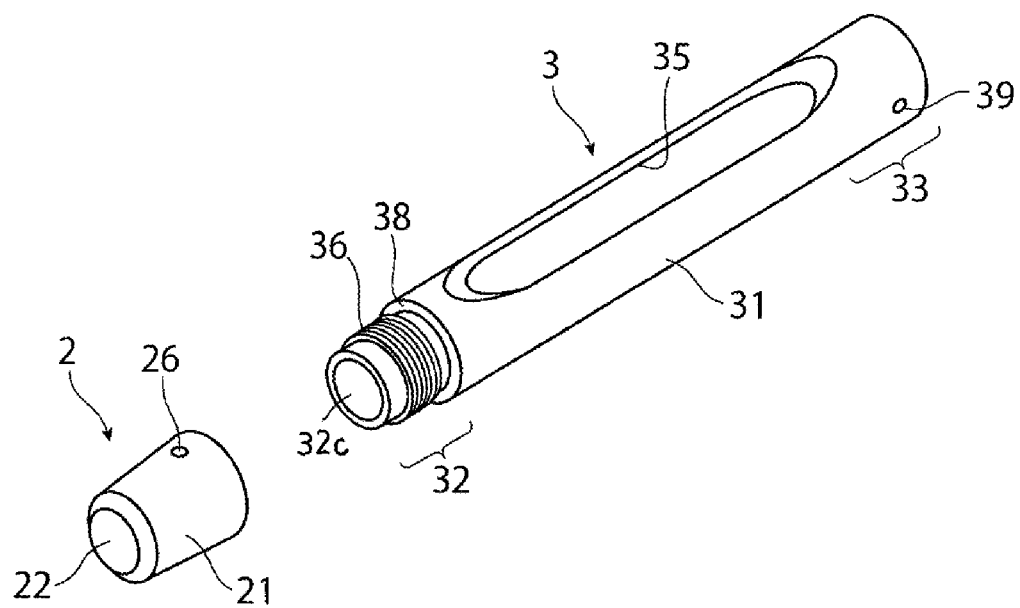
FIG. 1(B) is a perspective view for illustrating a disassembled state of the piercing tool according to the first embodiment.

In FIG. 1(A), FIG. 1(B), and FIG. 2, a piercing tool according to a first embodiment of the present invention is illustrated.

As illustrated in FIG. 1(A), FIG. 1(B), and FIG. 2, a piercing tool 1 according to the first embodiment includes a distal end portion 2 and a main body portion 3. The distal end portion 2 is first brought into abutment against an object to be pierced. The main body portion 3 has one end portion to which the distal end portion 2 is to be mounted. In addition, the distal end portion 2 is removably mounted to the one end portion of the main body portion 3.

Further, the piercing tool 1 is configured as, for example, a piercing tool, which is a so-called tine, to be used for an operation such as perforation, which is performed by piercing the ground such as turf being an example of the object with the piercing tool and pulling out the piercing tool.

The distal end portion 2 of the piercing tool 1 is a portion having a tapered cylindrical shape in appearance, and is made of, for example, a metal material.

The distal end portion 2 includes a main body 21, a distal end port 22, a connection port 23, and a penetration space 24. The main body 21 has a tapered hollow cylindrical shape. The distal end port 22 is formed at an end portion (distal end portion) of the main body 21 on a side to be first brought into abutment against the object. The connection port 23 is formed at an end portion (rear end portion) of the main body 21 on a side to be mounted to the main body portion 3. The penetration space 24 passes through the main body 21 from the distal end port 22 to the connection port 23.

Figure 3A:
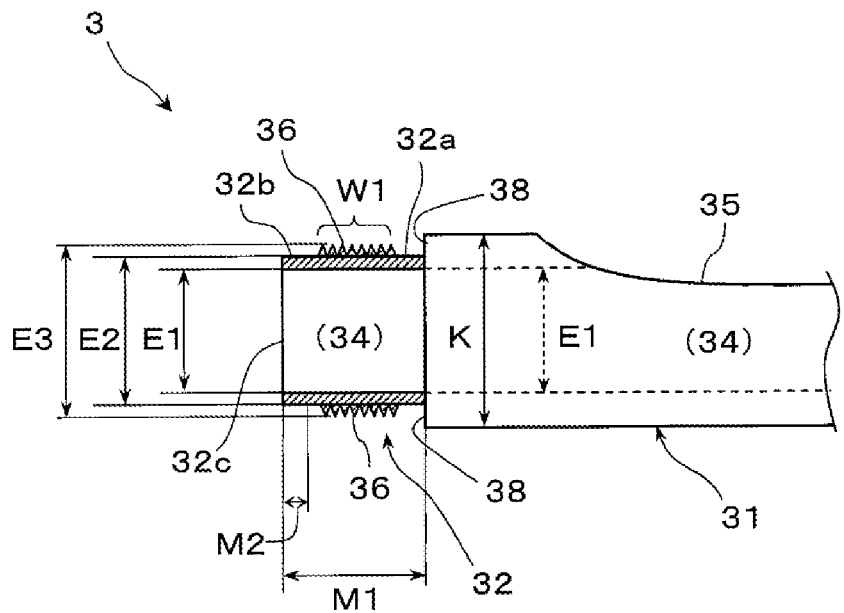
FIG. 3(A) is a side view for illustrating one end portion of the main body portion of FIG. 1(B) in a partial cross section.
Figure 3B:
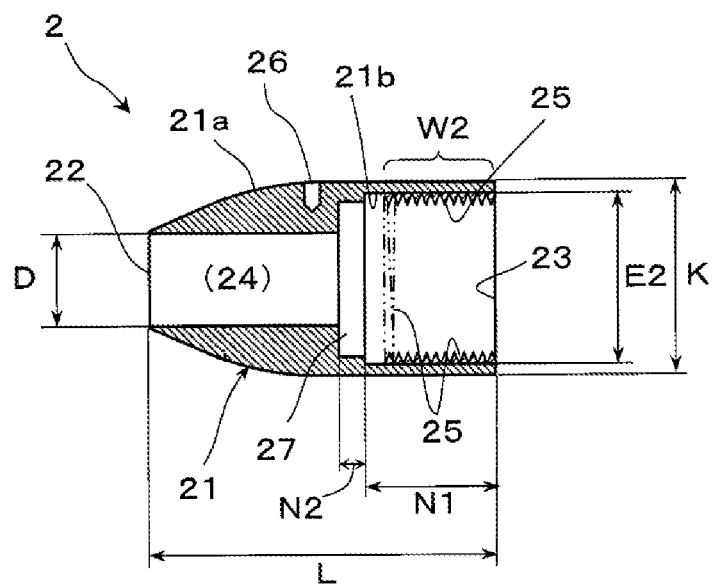
FIG. 3(B) is a schematic sectional view for illustrating a distal end portion of FIG. 1(B).

Further, as illustrated in FIG. 3(B) and other drawings, the distal end portion 2 has a female thread 25 formed at a part of an inner peripheral surface 21b entering the penetration space 24 from the connection port 23 of the main body 21.

Moreover, as illustrated in FIG. 1(A), FIG. 3(B), and other drawings, the distal end portion 2 has a hook hole 26 for inserting a projection 63 of a hook spanner 6 described later in an outer peripheral surface 21a of the main body 21.

The main body portion 3 in the piercing tool 1 is a portion having a substantially cylindrical shape in appearance, and is made of, for example, a metal material.

The main body portion 3 includes a main body 31, a mounting portion 32, an attaching portion 33, a penetration space 34, and an opening portion 35. The main body 31 has a hollow and substantially cylindrical shape. The mounting portion 32 has a cylindrical shape and is formed at an end portion of the main body 31 on a side on which the distal end portion 2 is connected and mounted. The attaching portion 33 is formed at an end portion of the main body 31 on a side opposite to the mounting portion 32 so as to be attached to a component such as a holder or a device to which the piercing tool 1 is to be attached at the time of using the piercing tool 1. The penetration space 34 passes through the main body 31 from the mounting portion 32 to the attaching portion 33. The opening portion 35 is formed so as to cut out a part of the main body 31 along a longitudinal direction.

Further, as illustrated in FIG. 1(A) to FIG. 3(A), the main body portion 3 has a male thread 36 formed on an outer peripheral surface of the mounting portion 32 located at the one end portion. The male thread 36 is a thread that engages with the female thread 25 of the distal end portion 2.

As illustrated in FIG. 1(B) and FIG. 3(A), the main body 31 of the main body portion 3 is a substantially cylindrical-shaped structure having a required length, and a required outer diameter K and a required inner diameter E1.

Further, as illustrated in FIG. 1(B) and FIG. 3(A), the mounting portion 32 of the main body portion 3 is a cylindrical-shaped portion having an outer diameter E3 and the inner diameter E1, which protrudes from the one end portion of the main body 31 by a predetermined length M1.

The mounting portion 32 is formed by, for example, cutting the one end portion of the main body 31 by cutting work. Therefore, the outer diameter E3 of the mounting portion 32 is smaller than the outer diameter K of the main body 31 before the work (E3<K).

In the mounting portion 32, the male thread 36 is formed to have a required thread length W1 at the substantial center of the outer peripheral surface having the length M1. Further, the mounting portion 32 has an outer peripheral surface portion 32a having a groove shape in which the male thread 36 is absent between the male thread 36 and the end portion of the main body 31. Further, the mounting portion 32 has an outer peripheral surface portion 32b having a cylindrical shape in which the male thread 36 is absent on a side opposite to the outer peripheral surface portion 32a with respect to the male thread 36. Further, one end of the mounting portion 32 is open and serves as one end of the penetration space 34 of the main body 31. The reference symbol 32c in FIG. 1(B) and other drawings denotes an opening of the mounting portion 32.

Both the outer peripheral surface portion 32a and the outer peripheral surface portion 32b are portions each formed of a cylindrical surface having an outer diameter E2(<E3) smaller than the original outer diameter E3 of the mounting portion 32. Further, the male thread 36 is formed such that valleys formed between thread ridges each have a depth substantially reaching a position of the outer diameter E2 described above except for an incomplete thread portion 37 described later.

Further, as illustrated in FIG. 1(B) and FIG. 3(A), a step is formed between the main body 31 and the outer peripheral surface portion 32a, and a wall surface portion formed by the step is formed as a wall surface portion 38 that stops a rear end portion of the distal end portion 2 through contact.

As illustrated in FIG. 1(B) and FIG. 2, the attaching portion 33 of the main body portion 3 uses an area of another end portion of the main body 31 having a hollow cylindrical shape at it is, and has a through hole 39 for causing a fixing component 4 such as a bolt described later to pass therethrough at a part of the attaching portion 33.

Meanwhile, as illustrated in FIG. 1(B) and FIG. 3(B), the main body 21 of the distal end portion 2 is a cylindrical structure having a required length L and an outer diameter K at the end portion with the connection port 23.

Further, the main body 21 has the penetration space 24 having a plurality of inner diameters. An inner diameter E2 at the portion of the main body 21 into which the mounting portion 32 of the main body portion 3 is to be fitted at the time of mounting the distal end portion 2 to the main body portion 3 is set so as to have substantially the same dimensional relationship with the outer diameter E2 of the mounting portion 32. Further, the portion of the main body 21 into which the mounting portion 32 of the main body portion 3 is to be fitted is formed as a cylindrical-shaped inner peripheral surface having a length N1 which is substantially equal to the length M1 of the mounting portion 32.

As illustrated in FIG. 3(B), in the portion of the main body 21 into which the mounting portion 32 is to be fitted, the female thread 25 is formed to have a required length W2 from the connection port 23. The female thread 25 is formed of thread ridges which are spirally continuous at a required pitch. The two-dot chain lines in FIG. 3(B) represent a part of the female thread 25 in the spirally continuous state.

Further, as illustrated in FIG. 3(B), the portion of the main body 21 into which the mounting portion 32 is to be fitted has an inner peripheral surface portion 27 having an annular shape on a far side of the female thread 25 (side on which the distal end port 22 is formed). At least a part of the outer peripheral surface portion 32b having a cylindrical shape in the mounting portion 32 of the main body portion 3 is to be fitted into inner peripheral surface portion 27. The inner peripheral surface portion 27 is formed, for example, as a portion having a required length M2.

Further, the distal end port 22 of the main body 21 is formed as a circular opening portion having a required hole diameter D. The distal end port 22 is formed in the tapered distal end of the main body 21, and hence the hole diameter D of the distal end port 22 is smaller than the inner diameter E2 of the connection port 23 located on a side opposite to the distal end port 22 (D<E2). Further, the distal end port 22 is formed in such a shape that an edge portion thereof is sharpened in a tapered shape in cross section.

As exemplified in FIG. 3(B), the penetration space 24 located on the distal end port 22 side of the main body 21 is formed as a cylindrical space continuous while having an inner diameter equal to the hole diameter D of the distal end port 22. However, the penetration space 24 located on the distal end port 22 side is not limited to such a mode, and may be formed as, for example, a space having an inner peripheral surface shape whose inner diameter gradually changes so as to be substantially along the tapered shape in appearance of the main body 21.

Further, one hook hole 26 in the outer peripheral surface 21a of the distal end portion 2 is formed at a portion closer to the distal end port 22 with respect to the inner peripheral surface 21b in which the female thread 25 is formed. The hook hole 26 is formed as, for example, a hole having a hole diameter and a depth that allow insertion of the projection 63 of the hook spanner 6 or the like as exemplified in FIG. 6(A).

Figure 6A:
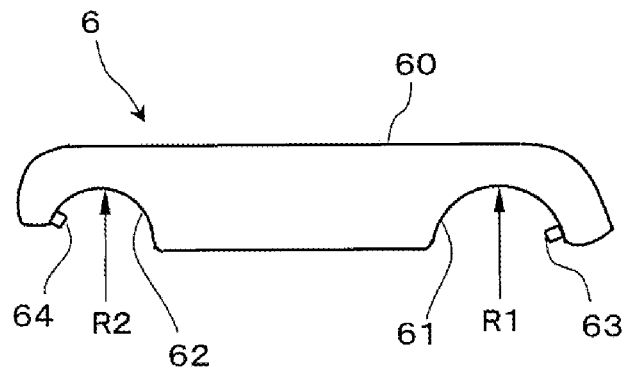
FIG. 6(A) is a schematic front view for illustrating a hook spanner to be used when the distal end portion in the piercing tool of FIG. 1(A) is to be mounted to or removed from the main body portion.

The hook spanner 6 is a kind of fastening tool. As illustrated in FIG. 6(A), the hook spanner 6 includes acting portions 61 and 62 and projections 63 and 64. The acting portions 61 and 62 are formed at both end portions of a plate-like member 60 so as to have a shape curved to be recessed inward. The projections 63 and 64 are formed at one end portions of the acting portions 61 and 62 so as to protrude. The acting portions 61 and 62 are formed as portions curved by arcs with curvature radii R1 and R2 set so as to correspond to the size of an object to be fastened. The hook spanner 6 is not limited to this configuration, and, for example, may include one acting portion.

Further, in the piercing tool 1, the distal end portion 2 is formed so as to have the Rockwell hardness higher than the Rockwell hardness of the main body portion 3.

The Rockwell hardness is the Rockwell hardness (HRC) measured by a Rockwell type hardness tester (manufactured by FUTURE-TECH CORP.: FR series). Specifically, the Rockwell hardness of the distal end portion 2 is measured by the model FR-1L of the Rockwell type hardness tester described above, and the Rockwell hardness of the main body portion 3 is measured by the model FR-1 of the Rockwell type hardness tester described above.

Figure 8A:
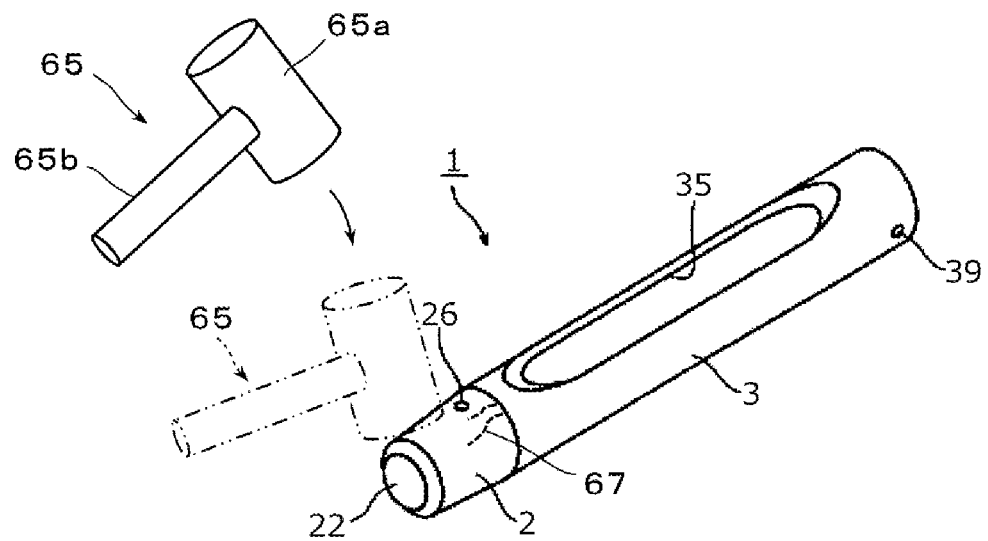
FIG. 8(A) is a view for illustrating another example of a method of removing the distal end portion and is a schematic perspective view for illustrating a state of a hammering operation when the distal end portion is to be removed.

It is only required that the Rockwell hardness of the distal end portion 2 be hardness that allows cracks to be easily formed when the distal end portion 2 is hit by a hammering tool such as a hammer (having a weight in a range of from 1 to 2 pounds) by causing the hammering tool to naturally drop from a height of about 30 cm at the time of replacement of the distal end portion 2 (see FIG. 8(A)). Meanwhile, it is only required that the Rockwell hardness of the main body portion 3 be hardness that does not allow cracks to be formed or allows cracks to be less liable to be formed when the main body portion 3 is hit by the hammering tool such as a hammer similarly to the distal end portion 2.

In this embodiment, the Rockwell hardness of the distal end portion 2 is set within a range of from 59 or more and 64 or less, and the Rockwell hardness of the main body portion 3 is set within a range of from 50 or more and 56 or less.

When the Rockwell hardness of the distal end portion 2 is less than 59, there is a trouble that the durability in a piercing operation is liable to be lowered, and the life of the product is liable to be shortened. In contrast, when the Rockwell hardness of the distal end portion 2 exceeds 64, there is a trouble that the toughness is lowered so that the distal end portion 2 becomes brittle, with the result that the distal end portion 2 is liable to be broken in the piercing operation.

It is preferred that the Rockwell hardness of the distal end portion 2 and the Rockwell hardness of the main body portion 3 be set to values within the above-mentioned ranges, for example, even when the outer diameter or the thickness differs in the distal end portion 2 and the main body portion 3.

Figure 4:
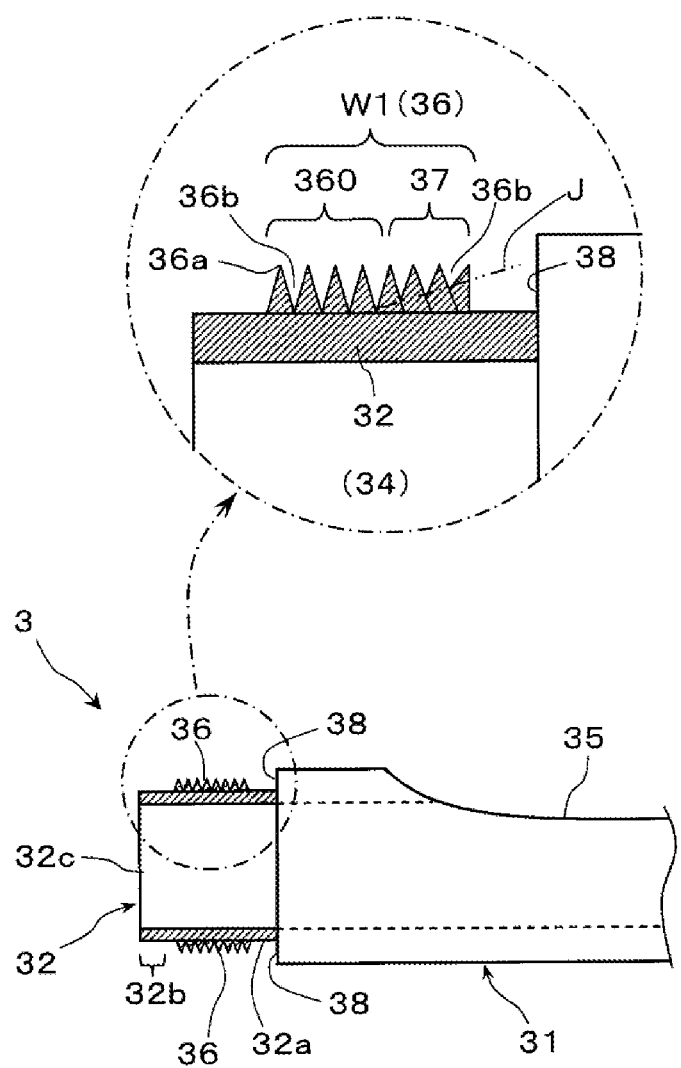
FIG. 4 is a side view of the one end portion of the main body portion of FIG. 3(A) and a side view for illustrating a part of the one end portion in an enlarged cross section.

Further, in the piercing tool 1, as illustrated in FIG. 4 in an enlarged manner, the male thread 36 of the main body portion 3 is formed as a thread portion including the incomplete thread portion 37 in addition to a complete thread portion 360.

The incomplete thread portion 37 is formed in an end portion area in the thread length W1 of the male thread 36 which is away from the end portion of the main body portion 3 on the side on which the distal end portion 2 is mounted. The incomplete thread portion 37 in the first embodiment is formed in such a shape that valleys 36b located between ridges 36a of the male thread 36 become shallower as being away from the above-mentioned end portion of the main body portion 3. A straight line J of the two-dot chain line illustrated in the circle of the one-dot chain line in FIG. 4 is an imaginary line passing through the bottoms of the valleys 36b adjacent to each other in the incomplete thread portion 37.

Such an incomplete thread portion 37 is formed, for example, in a range corresponding to two to three pitches of the male thread 36.

In the piercing tool 1, the distal end portion 2 is mounted to or removed from the main body portion 3 as follows.

Figure 5A:
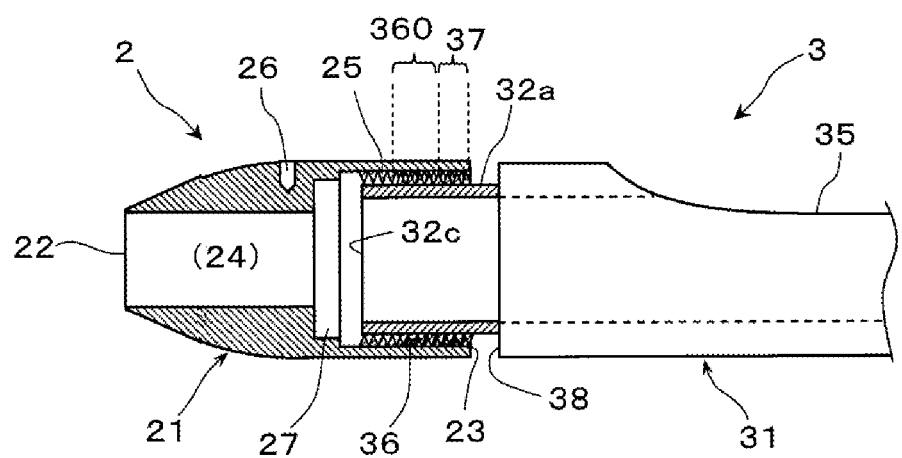
FIG. 5(A) is a side view for illustrating a state in the middle of mounting the distal end portion of FIG. 3(A) to the main body portion of FIG. 3(B) or removing the distal end portion from the main body portion in a partial cross section.

First, in mounting of the distal end portion 2, as illustrated in FIG. 5(A), the connection port 23 of the distal end portion 2 is brought closer to the mounting portion 32 of the main body portion 3, and then, the distal end portion 2 is operated so as to be turned in the fastening direction of the threads.

In this case, in an initial stage, the female thread 25 in the distal end portion 2 engages with the complete thread portion 360 (FIG. 4) of the male thread 36 in the main body portion 3 without any problem, and the distal end portion 2 moves so as to approach the main body portion 3 through the engagement of the threads.

Subsequently, when the female thread 25 in the distal end portion 2 reaches the incomplete thread portion 37 of the male thread 36 in the main body portion 3, the female thread 25 becomes unable to engage with the incomplete thread portion 37 in a normal state due to the difference in the valley shape of the thread, and the distal end portion 2 receives resistance and is less liable to move.

Figure 6B:
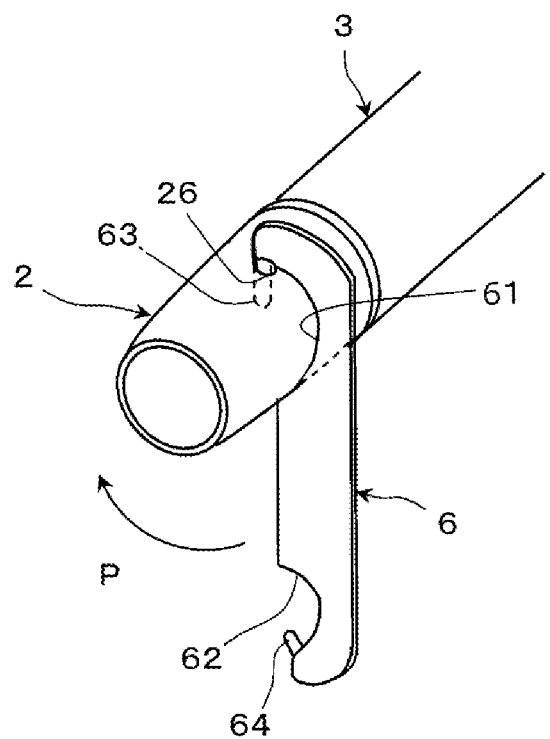
FIG. 6(B) is a schematic perspective view for illustrating an example of a use state of the hook spanner of FIG. 6(A).

After this stage, as exemplified in FIG. 6(B), a mounting action is performed using the hook spanner 6. That is, in this case, the projection 63 of the corresponding acting portion 61 of the hook spanner 6 is inserted into the hook hole 26 of the distal end portion 2, and the acting portion 61 is brought into close contact with the outer peripheral surface of the distal end portion 2. Then, the hook spanner 6 is turned in a required direction P being the fastening direction.

With this, the distal end portion 2 is turned by receiving a strong fastening action of the hook spanner 6 so that the female thread 25 obtains a strong propulsive force through engagement with the complete thread portion 360 of the male thread 36.

Figure 5B:
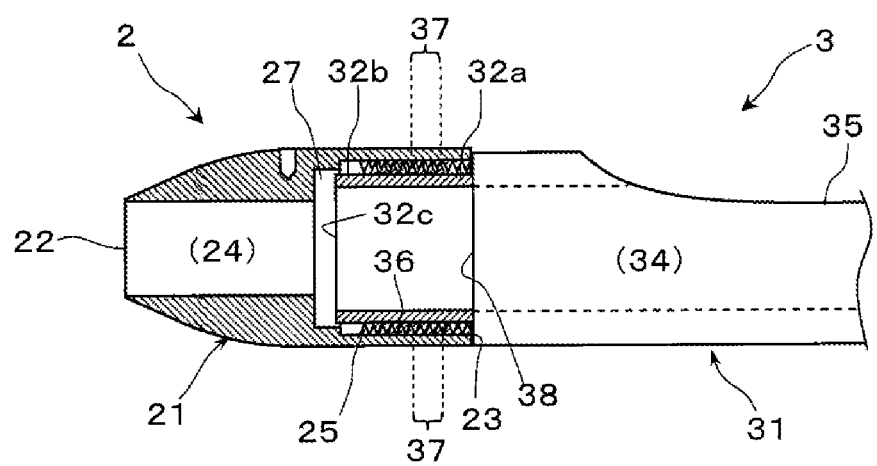
FIG. 5(B) is a side view for illustrating a state in which the distal end portion of FIG. 3(A) is completely mounted to the main body portion of FIG. 3(B) in a partial cross section.

As a result, as illustrated in FIG. 5(B), the distal end portion 2 advances such that the female thread 25 in the distal end portion 2 forcibly climbs over the incomplete thread portion 37 of the male thread 36 in the main body portion 3.

Finally, as illustrated in FIG. 5(B), the distal end portion 2 stops after the edge portion of the connection port 23 comes into contact with the wall surface portion 38 which forms the step with the mounting portion 32 in the main body portion 3.

At this time, a part of the female thread 25 in the distal end portion 2 which has already climbed over the incomplete thread portion 37 of the male thread 36 in the main body portion 3 is opposed to the outer peripheral surface portion 32a having a groove shape in the mounting portion 32 of the main body portion 3. Further, at this time, the inner peripheral surface portion 27 in the distal end portion 2 is slightly fitted to the outer peripheral surface portion 32b having a cylindrical shape of the mounting portion 32 in the main body portion 3. Further, at this time, the penetration space 24 in the distal end portion 2 and the penetration space 34 in the main body portion 3 are connected to each other in a continuous manner.

Thus, as illustrated in FIG. 1(A) and FIG. 5(B), the distal end portion 2 is assembled to the main body portion 3 by being mounted thereto without any gap. That is, the distal end portion 2 is assembled to the main body portion 3 so that the piercing tool 1 is assembled.

As described above, in the piercing tool 1, the distal end portion 2 can easily be mounted to the main body portion 3 through the engagement between the female thread 25 and the male thread 36.

Further, in the piercing tool 1, at least a part of the female thread 25 in the distal end portion 2 is mounted to the incomplete thread portion 37 of the male thread 36 by forcibly engaging therewith in a non-normal state, and hence the piercing tool 1 has the structure in which the distal end portion 2 is less liable to be removed from the main body portion 3. Therefore, in the piercing tool 1, even when the threads start to be loosened during use such as abutment of the distal end portion 2 against an object, the distal end portion 2 is prevented from being easily turned in a loosening direction of the threads due to the presence of the engaged portion between the female thread 25 and the incomplete thread portion 37, and there is no fear in that the distal end portion 2 is removed from the main body portion 3.

Further, in the piercing tool 1, even with the structure in which the incomplete thread portion 37 is present, when the distal end portion 2 is to be mounted to the main body portion 3, a mounting operation can be performed using the hook spanner 6. With this, the mounting operation can easily be performed without damaging the outer peripheral surface of the distal end portion 2.

Next, as illustrated in FIG. 6(B), the distal end portion 2 can be removed by turning the distal end portion 2 in the loosening direction of the threads using the hook spanner 6.

With this, the distal end portion 2 is turned by receiving a strong turning action of the hook spanner 6 so that the female thread 25 obtains a strong propulsive force through the engagement with the complete thread portion 37 of the male thread 36.

As a result, as illustrated in FIG. 5(B), the distal end portion 2 advances such that the female thread 25 climbs over the incomplete thread portion 37 of the male thread 36 in the main body portion 3.

Finally, as illustrated in FIG. 1(B) and other drawings, the distal end portion 2 is removed from the mounting portion 32 of the main body portion 3.

Thus, in the piercing portion 1, the distal end portion 2 is removed and disassembled from the main body portion 3.

As described above, in the piercing tool 1, the distal end portion 2 can easily be removed from the main body portion 3 by releasing the engagement between the female thread 25 and the male thread 36.

Further, the piercing tool 1 has a mechanism in which the distal end portion 2 is mounted by passing through the incomplete thread portion 37 in the male thread 36. Therefore, even when the thread in the distal end portion 2 is temporarily loosened from the main body portion 3, due to the presence of the incomplete thread portion 37, there is no fear in that the distal end portion 2 easily turns in the loosening direction of the threads to be inadvertently removed from the main body portion 3.

Moreover, in the piercing tool 1, even with the structure in which the incomplete thread portion 37 is present, with use of the hook spanner 6, the removing operation of the distal end portion 2 from the main body portion 3 can easily be performed.

Figure 7A:
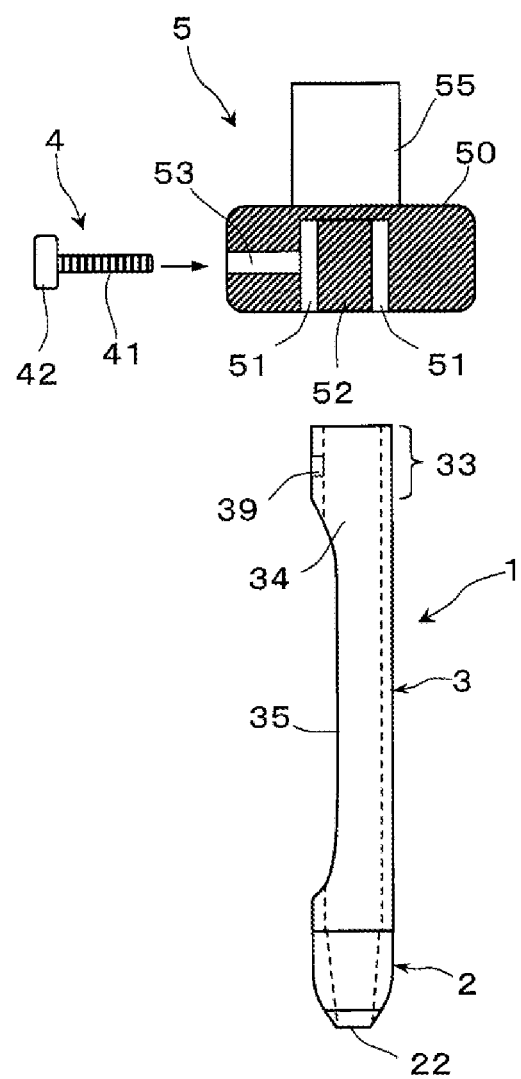
FIG. 7(A) is a schematic view for illustrating an example of a holder to which the piercing tool of FIG. 1(A) is to be attached when the piercing tool is used in a partial cross section.
Figure 7B:
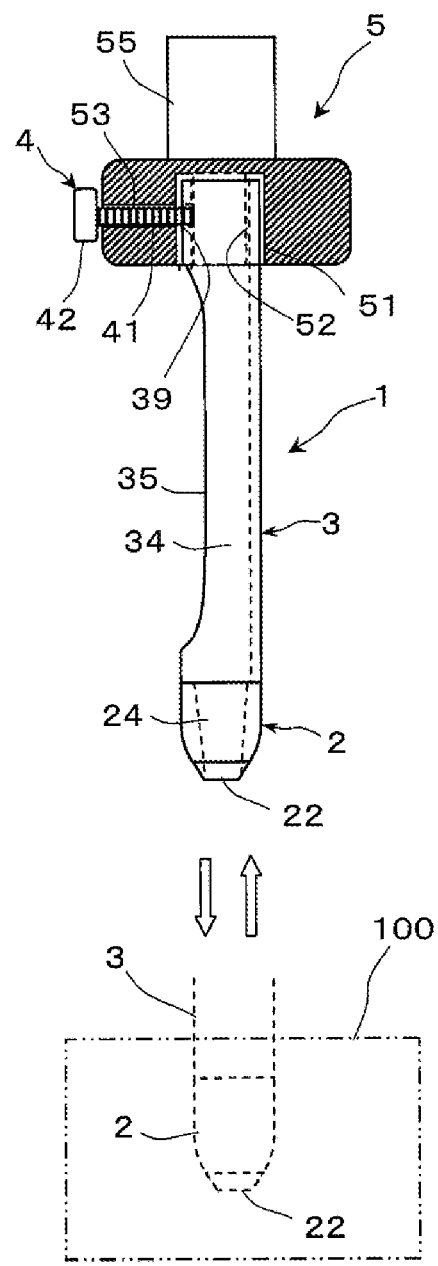
FIG. 7(B) is a schematic view for illustrating a state when the piercing tool of FIG. 1(A) is attached to the holder of FIG. 7(A) and used in a partial cross section.

As illustrated in FIG. 7(B), the piercing tool 1 is used, for example, in a state of being mounted to a holding member 5 such as a holder.

As illustrated in FIG. 7(A), the holding member 5 illustrated in FIG. 7 includes a holding main body 50 having an attaching hole 51 formed therein. The holding main body 50 has a required shape. The attaching portion 33 in the main body portion 3 of the piercing tool 1 is to be fitted into the attaching hole 51. The attaching portion 33 of the piercing tool 1 is a portion having a hollow cylindrical shape, and hence the attaching hole 51 is formed as a hole having a cylindrical shape in which a support column portion 52 having a columnar shape is formed at the center portion. Further, one attaching hole 51 formed in the holding member 5 is illustrated in FIG. 7(A). However, in general, a plurality of attaching holes 51 are formed in the holding member 5.

Further, the holding member 5 has a fixing hole 53. The fixing component 4 configured to fix the attaching portion 33 of the piercing tool 1 mounted to the attaching hole 51 is inserted into the fixing hole 53 and fixed. The fixing hole 53 is a hole penetrating to the attaching hole 51 and facing the support column portion 52. Further, the fixing hole 53 is formed at a position facing the through hole 39 in the attaching portion 33 of the piercing tool 1. Further, when the fixing component 4 is a screw, the fixing hole 53 has a female thread formed in the hole.

Moreover, the holding member 5 includes a mounting support column 55 for mounting the holding member 5 having the piercing tool 1 attached thereto to a device such as a perforator (not shown) configured to actually move the piercing tool 1.

For example, a screw or the like is applied to the fixing member 4. The fixing member 4 illustrated in FIG. 7(A) includes a thread portion 41 and a head portion 42. The thread portion 41 has a male thread formed thereon. The head portion 42 has a diameter larger than that of the thread portion 41.

In attaching the piercing tool 1 to the holding member 5, as illustrated in FIG. 7(B), the attaching portion 33 of the piercing tool 1 is fitted into the attaching hole 51. At this time, the support column portion 52 in the attaching hole enters an internal space (penetration space 34) of the attaching portion 33.

Subsequently, the fixing member 4 is inserted from the fixing hole 53 of the holding member 5 to pass through the through hole 39 of the attaching portion 33 of the piercing tool 1 so that the fixing member 4 is pressed against the support column portion 52.

Thus, as illustrated in FIG. 7(B), the piercing tool 1 is attached to the attaching hole 51 of the holding member 5. Further, the holding member 5 having the piercing tool 1 attached thereto is mounted to a device such as a perforator (not shown).

Further, when the piercing tool 1 is to be removed from the holding member 5, the piercing tool 1 can easily be removed from the attaching hole 51 of the holding member 5 by removing or loosening the fixing member 4.

In using the piercing tool 1, as exemplified in FIG. 7(B), the piercing tool 1 is caused to pierce an object 100 such that distal end portion 2 is first brought into abutment against the object 100, and then is moved so as to be pulled out.

For example, when the object 100 is the ground such as turf, the piercing tool 1 can be used for performing a perforating operation on the turf being the object 100. Incidentally, at the time of the perforating operation, in the piercing tool 1, roots of the grass or soil that enters the distal end hole 22 of the distal end portion 2 moves through the penetration space 24 of the distal end portion 22 to enter the penetration space 34 of the main body portion 3, and is finally discharged to an outside through the opening portion 35.

Further, in the piercing tool 1, the piercing operation is repeatedly performed on the object 100 such as the ground in this manner, with the result that the distal end portion 2, which is to be first brought into abutment against the object 100, may be worn or partially broken.

In this case, in the piercing tool 1, only the distal end portion 2 can be removed from the main body portion 3 and replaced with a new distal end portion 2 to cope with the situation. Further, the replacement operation can be performed on the piercing tool 1 attached to the holding member 5 without removing the piercing tool 1 from the holding member 5.

Further, in the piercing tool 1, it is difficult to remove the distal end portion 2 after use in the piercing operation or the like in some cases. The difficulty in removing the distal end portion 2 is caused, for example, because the distal end portion 2 is deformed due to the use, the engagement degree of the male thread 36 becomes stronger as compared with that in the initial stage, and it becomes difficult to loosen the engagement of the threads even by turning the distal end portion 2 with use of the hook spanner 6.

However, in the piercing tool 1, as illustrated in FIG. 8(A), the distal end portion 2 which is difficult to be removed is hit from a height of, for example, about 30 cm, by a hammering tool 65 such as a hammer, thereby being capable of easily removing the distal end portion 2 from the main body portion 3. That is, the distal end portion 2 of the piercing tool 1 has the Rockwell hardness relatively higher than that of the main body portion 3, and hence a crack 67 is likely to be formed due to the impact. The reference symbol 65a in FIG. 8(A) denotes a hammer head portion, and the reference symbol 65b denotes a handle part including a grip portion.

Therefore, in the distal end portion 2, the engagement of the threads is loosened due to the presence of the crack 67.

Figure 8B:
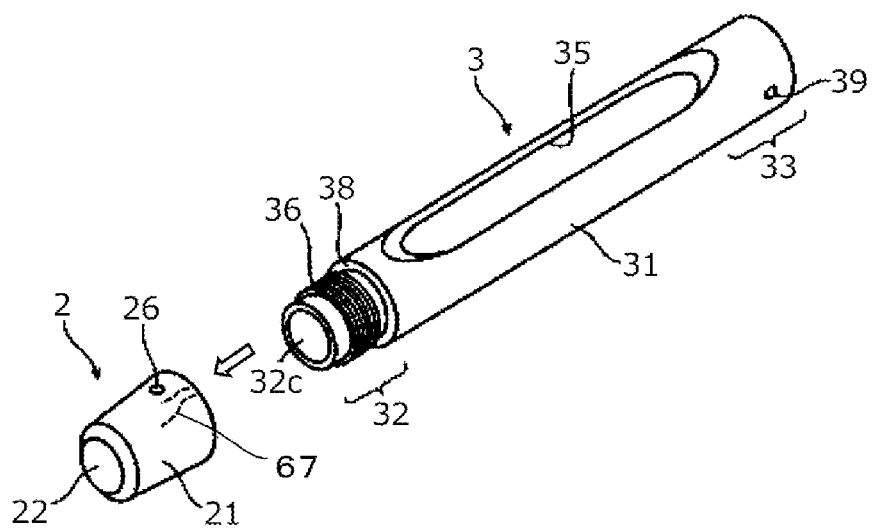
FIG. 8(B) is a schematic perspective view for illustrating a state when the distal end portion is removed from the main body portion after the hammering operation of FIG. 8(A) is performed.

Thus, as illustrated in FIG. 8(B), the distal end portion 2 can easily be removed from the main body portion 3.

Therefore, in the case of using the piercing tool 1, even when the distal end portion 2 is worn or partially broken, it is not required to replace the whole piercing tool 1 including the distal end portion 2 to cope with the situation. Further, such replacement can be performed while the piercing tool 1 is kept to be mounted to the holding member 5, and hence it is not required to perform the operation of removing the piercing tool 1 from the holding member 5.

Further, in the case of using the piercing tool 1, even when the distal end portion 2 is difficult to be removed, the distal end portion 2 can easily be removed from the main body portion 3, thereby being capable of easily performing the replacement operation of the distal end portion 2.

Second Embodiment

Figure 9A:
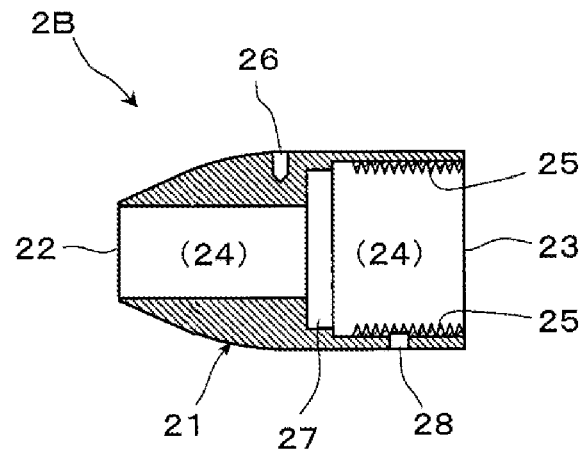
FIG. 9(A) is a schematic sectional view for illustrating a distal end portion in a modification example of the piercing tool.
Figure 9B:
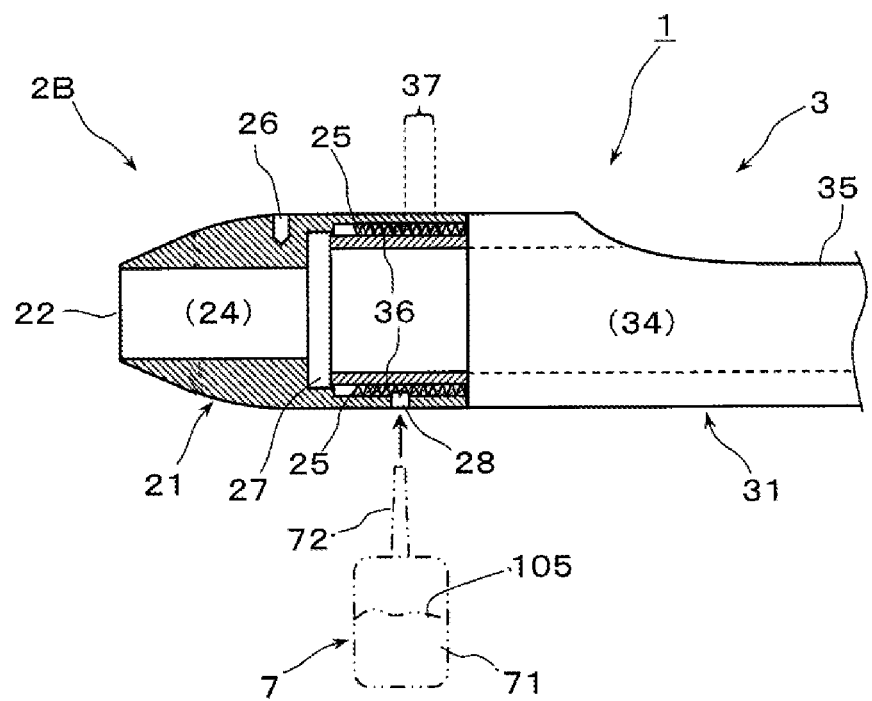
FIG. 9(B) is a side view for illustrating a use state when the distal end portion of the modification example of FIG. 9(A) is mounted to the main body portion in a partial cross section.

In FIG. 9(A) and FIG. 9(B), a piercing tool 1 according to a second embodiment is illustrated.

The piercing tool 1 according to the second embodiment has the same configuration as that of the piercing tool 1 according to the first embodiment except that a distal end portion 2B obtained by additionally forming an injection port 28 for injecting an adhesive in the distal end portion 2 is applied.

As illustrated in FIG. 9(A), the injection port 28 is formed so as to penetrate to a part of the female thread 25 in the distal end portion 2B. As illustrated in FIG. 9(B), the shape and size of the hole of the injection port 28 are selected so as to correspond to the shape and size of, for example, an injection portion 72 of an injector 7 configured to store an adhesive 105. The reference symbol 71 in FIG. 9(B) denotes a storage portion configured to store the adhesive 105. As the adhesive, for example, there is used an adhesive in a liquid state that exhibits an adhesive force to the extent that turning of the female thread 25 and the male thread 36 can be temporarily prevented with a small amount such as one drop or a few drops.

When the distal end portion 2B having the injection port 28 formed therein is to be mounted to the main body portion 3, as illustrated in FIG. 9(B), the distal end portion 2B is mounted to the main body portion 3 through fastening of the female thread 25 and the male thread 36. Then, the injection portion 72 of the injector 7 is inserted into the injection port 28, and the adhesive 105 in the injector 7 is injected.

With this, the female thread 25 and the male thread 36 can be bonded to each other with the adhesive 105 interposed in at least a part therebetween.

As a result, the distal end portion 2B is more rigidly mounted to the main body portion 3 with the adhesive force by the adhesive 105 in addition to the fastening force of the female thread 25 and the male thread 36.

Therefore, in the piercing tool 1 in which the distal end portion 2B is applied, the distal end portion 2B can be kept in a state of being less liable to be removed from the main body portion 3.

Meanwhile, when the distal end portion 2B is to be removed from the main body portion 3, it is only required to turn the distal end portion 2B under a state in which the distal end portion 2B is heated from the outside to release the fastening between the female thread 25 and the male thread 36.

Third Embodiment

Figure 10A:
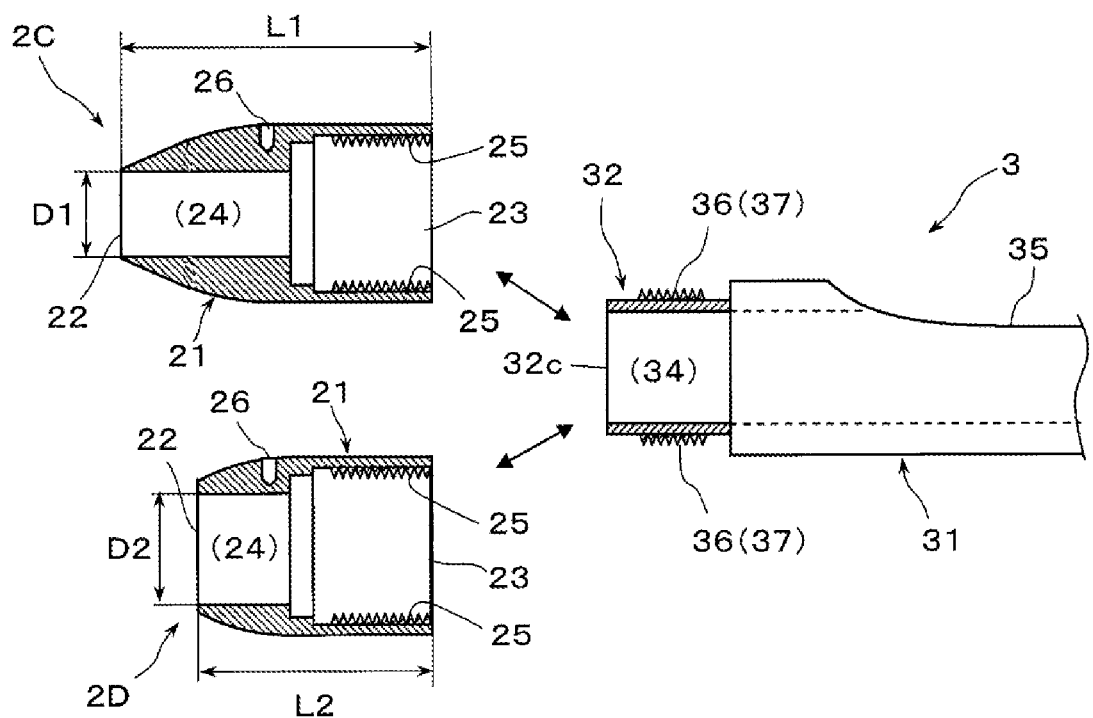
FIG. 10(A) is a view for illustrating another modification example of the piercing tool and is a schematic view for illustrating an example of a piercing tool including two kinds of distal end portions that differ in a size of a distal end opening and a length of the distal end portion.

In FIG. 10(A), a piercing tool 1 according to a third embodiment is illustrated.

As illustrated in FIG. 10(A), the piercing tool 1 according to the third embodiment has the same configuration as that of the piercing tool 1 according to the first embodiment except that a plurality of (two in this example) different kinds of distal end portions 2C and 2D that differ in the size of the opening of the distal end port 22 are provided.

Such piercing tool 1 including the plurality of distal end portions 2C and 2D provided in advance can be configured as a piercing tool kit. In the piercing tool kit, one main body portion 3 is provided and is used for the distal end portions 2C and 2D in common.

The distal end portion 2C illustrated in FIG. 10(A) has a circular distal end port 22 having a hole diameter D1, and the length of the distal end portion 2C is a predetermined length L1. Meanwhile, the distal end portion 2D illustrated in FIG. 10(A) has a circular distal end port 22 having a hole diameter D2(>D1) larger than the hole diameter D1 described above, and the length of the distal end portion 2D is a length L2(<L1) smaller than the length L1.

Further, the distal end portion 2C and the distal end portion 2D differ only in the size of the distal end port 22 and the length of the distal end portion, and the other configurations are the same.

In the piercing tool 1 including such a plurality of distal end portions 2C and 2D, the distal end portion 2C or 2D of a kind having the distal end port 22 or the like whose size is adapted to a state or a condition of the object 100 is selected and can be used under a state of being mounted to the main body portion 3. Further, the piercing tool 1 can be used while the distal end portion 2C or 2D is replaced with the other during use.

Figure 10B:
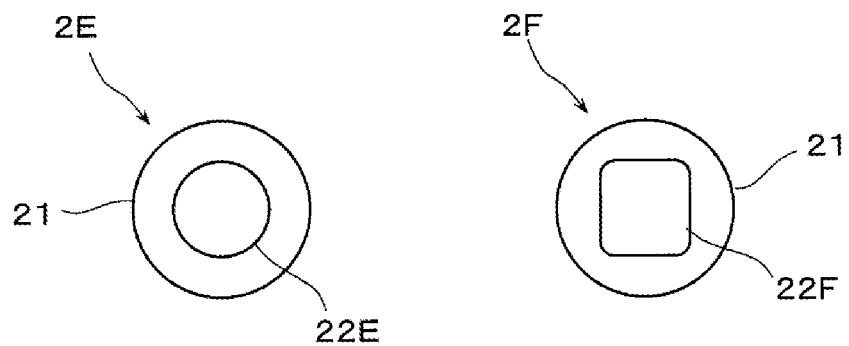
FIG. 10(B) is a schematic front view for illustrating examples of the two kinds of the distal end portions of FIG. 10(A) that differ in a shape of the distal end opening.

Further, as illustrated in FIG. 10(B), the piercing tool 1 according to the third embodiment has the same configuration as that of the piercing tool 1 according to the first embodiment except that a plurality of (two in this example) different kinds of distal end portions 2E and 2F that differ in the shape of the opening of the distal end port 22 are provided.

Such piercing tool 1 including the plurality of distal end portions 2E and 2F provided in advance can also be configured as a piercing tool kit.

The distal end portion 2E illustrated in FIG. 10(B) has a circular distal end port 22E. Meanwhile, the distal end portion 2F illustrated in FIG. 10(B) has a square distal end port 22F.

Further, the distal end portion 2E and the distal end portion 2F differ only in the shape of the distal end port 22, and the other configurations are the same.

In the piercing tool 1 including such a plurality of distal end portions 2E and 2F, the distal end portion 2E or 2F of a kind having the distal end port 22E or 22F whose shape is adapted to a state or a condition of the object 100 is selected and can be used under a state of being mounted to the main body portion 3. Further, the piercing tool 1 can also be used while the distal end portion 2E or 2F is replaced with the other during use.

Modification Examples

The present invention is not limited to the configuration examples of the piercing tool 1 according to the above-mentioned first to third embodiments, and includes, for example, the following modification examples.

The configuration of mounting and removing the distal end portion 2 (including the distal end portions 2B to 2F) to and from the main body portion 3 in the piercing tool 1 is not limited to the configuration of fastening the female thread 25 and the male thread 36 to each other, and other coupling methods that enables mounting and removing can be employed without hindering the use of the piercing tool 1.

Further, the configuration of the incomplete thread portion 37 in the male thread 36 is not limited to the configuration example in the first embodiment, and other configurations for forming the incomplete thread portion may be applied. Besides, formation of the incomplete thread portion 37 may be omitted as long as the distal end portion 2 can firmly be mounted. For example, in the piercing tool 1 according to the first embodiment, formation of the incomplete thread portion 37 can be omitted. Further, when formation of the incomplete thread portion 37 is omitted, for example, it is preferred that the injection port 28 for an adhesive be formed.

Further, when the distal end portion 2 is to be mounted or removed, the distal end portion 2 may be turned manually or using other tools without using the hook spanner 6. In this case, for example, formation of the hook hole 26 in the outer peripheral surface 21a of the distal end portion 2 can be omitted.

Further, in the distal end portion 2, formation of the inner peripheral surface portion 27, into which the outer peripheral surface portion 32b having a cylindrical shape in the mounting portion 32 of the main body portion 3 is to be fitted, may be omitted. In this case, the operation of forming the inner peripheral surface portion 27 becomes unnecessary.

Further, other modes may be applied to the main body portion 3 of the piercing tool 1 as long as the main body portion 3 includes the mounting portion 32 to which the distal end portion 2 is to be mounted. Further, the attaching portion 33 of the main body portion 3 is not limited to the configuration example described in the first embodiment, and may have other configurations, for example, in consideration of adaptation to an attaching form in the holding member 5 or the like to which the piercing tool 1 is to be attached.

Further, the piercing tool including the plurality of distal end portions 2 may include a plurality of distal end portions of different kinds that differ in both the size and shape of the opening of the distal end port 22. Moreover, the piercing tool including the plurality of distal end portions 2 may include a plurality of distal end portions of different kinds that differ in the material.

Besides, the piercing tool 1 may be configured as, for example, a piercing tool for performing a boring operation or a punching operation on the object 100 made of a base material such as leather. Further, the holding member 5 to which the piercing tool 1 is to be attached is not limited to the configuration described in the first embodiment, and, as a matter of course, may have other configurations including commercially available products of a form capable of attaching the piercing tool 1.

REFERENCE SIGNS LIST

1 . . . piercing tool
2, 2B . . . distal end portion
2C, 2D, 2E, 2F . . . plurality of distal end portions
3 . . . main body portion
6 . . . hook spanner
21b . . . inner peripheral surface
25 . . . female thread
27 . . . inner peripheral surface portion having annular shape
28 . . . injection port
32a . . . outer peripheral surface portion having groove shape
32b . . . outer peripheral surface portion having cylindrical shape
36 . . . male thread
36b . . . valley
37 . . . incomplete thread portion
38 . . . wall surface portion
100 . . . object

The invention claimed is:

1. A piercing tool, comprising:
a distal end portion, which has a cylindrical shape, and is to be first brought into abutment against an object; and
a main body portion, which has a cylindrical shape at at least a part of the main body portion, and has one end portion to which the distal end portion is mounted,
wherein the distal end portion is removably mounted to the one end portion of the main body portion, and has an inner peripheral surface having a female thread formed at an end portion of the distal end portion on a side to be mounted to the main body portion,
wherein the main body portion has an outer peripheral surface having a male thread formed so as to be engaged with the female thread at the end portion of the main body portion on a side to which the distal end portion is mounted,
wherein the distal end portion has a Rockwell hardness higher than a Rockwell hardness of the main body portion,
wherein the male thread includes an incomplete thread portion formed in an inner end portion area away from the one end portion of the main body portion, and
wherein the incomplete thread portion is a portion that engages with a part of the female thread of the distal end portion in a non-normal state, and is formed in a shape in which valleys of the male thread become shallower as being away from the one end portion of the main body portion.

2. The piercing tool according to claim 1, wherein the Rockwell hardness of the distal end portion is set within a range of from 59 or more and 64 or less, and the Rockwell hardness of the main body portion is set within a range of from 50 or more and 56 or less.

3. The piercing tool according to claim 1, wherein the main body portion includes:
a wall surface portion that stops the end portion of the distal end portion through contact, and
an outer peripheral surface portion having a groove shape in which the male thread is absent between the wall surface portion and the male thread.

4. The piercing tool according to claim 1, wherein the main body portion includes an outer peripheral surface portion having a cylindrical shape in which the male thread is absent at the end portion on the side to which the distal end portion is mounted, and the distal end portion includes an inner peripheral surface portion having an annular shape into which the outer peripheral surface portion having the cylindrical shape is fitted on a far side of the female thread in the inner peripheral surface in which the female thread is formed.

5. The piercing tool according to claim 1, wherein an outer peripheral surface of the distal end portion has an injection hole for injecting an adhesive, which penetrates through the outer peripheral surface of the distal end portion, formed in an area in which the female thread is present.

6. The piercing tool according to claim 1, wherein an outer peripheral surface of the distal end portion has a hook hole for inserting a projection of a hook spanner.

7. The piercing tool according to claim 1, further comprising, as the distal end portion, a plurality of distal end portions of different kinds that differ in one or both of a size and a shape of an opening of a distal end port to be first brought into abutment against the object, or a plurality of distal end portions of different kinds that differ in a material.

8. The piercing tool according to claim 2, further comprising, as the distal end portion, a plurality of distal end portions of different kinds that differ in one or both of a size and a shape of an opening of a distal end port to be first brought into abutment against the object, or a plurality of distal end portions of different kinds that differ in a material.

9. The piercing tool according to claim 3, further comprising, as the distal end portion, a plurality of distal end portions of different kinds that differ in one or both of a size and a shape of an opening of a distal end port to be first brought into abutment against the object, or a plurality of distal end portions of different kinds that differ in a material.

10. The piercing tool according to claim 4, further comprising, as the distal end portion, a plurality of distal end portions of different kinds that differ in one or both of a size and a shape of an opening of a distal end port to be first brought into abutment against the object, or a plurality of distal end portions of different kinds that differ in a material.

11. The piercing tool according to claim 5, further comprising, as the distal end portion, a plurality of distal end portions of different kinds that differ in one or both of a size and a shape of an opening of a distal end port to be first brought into abutment against the object, or a plurality of distal end portions of different kinds that differ in a material.

12. The piercing tool according to claim 6, further comprising, as the distal end portion, a plurality of distal end portions of different kinds that differ in one or both of a size and a shape of an opening of a distal end port to be first brought into abutment against the object, or a plurality of distal end portions of different kinds that differ in a material.

* * * * *